United States Patent
Baumgaertner

(10) Patent No.: US 11,494,535 B2
(45) Date of Patent: Nov. 8, 2022

(54) METHOD AND DEVICE FOR SIMULATING A CONTROL UNIT

(71) Applicant: Robert Bosch GmbH, Stuttgart (DE)

(72) Inventor: Rainer Baumgaertner, Pfaffenhofen (DE)

(73) Assignee: Robert Bosch GmbH, Stuttgart (DE)

( * ) Notice: Subject to any disclaimer, the term of this patent is extended or adjusted under 35 U.S.C. 154(b) by 224 days.

(21) Appl. No.: 16/943,381

(22) Filed: Jul. 30, 2020

(65) Prior Publication Data

US 2021/0081584 A1  Mar. 18, 2021

(30) Foreign Application Priority Data

Sep. 17, 2019 (DE) .......................... 102019214162.5

(51) Int. Cl.
  *G06F 30/20* (2020.01)
  *G06F 17/18* (2006.01)
  *G06F 119/12* (2020.01)

(52) U.S. Cl.
  CPC .............. *G06F 30/20* (2020.01); *G06F 17/18* (2013.01); *G06F 2119/12* (2020.01)

(58) Field of Classification Search
  CPC ....... G06F 2119/12; G06F 17/18; G06F 30/20
  USPC .................................................. 703/6, 8, 13
  See application file for complete search history.

(56) References Cited

U.S. PATENT DOCUMENTS

| | | | |
|---|---|---|---|
| 2004/0158387 A1* | 8/2004 | Yasui | F02D 41/2477 701/108 |
| 2011/0184713 A1* | 7/2011 | Yang | G06F 30/33 703/13 |
| 2015/0309920 A1* | 10/2015 | Ishigooka | G06F 11/3688 717/126 |

FOREIGN PATENT DOCUMENTS

| | | |
|---|---|---|
| DE | 102018207172 A1 | 6/2018 |
| WO | 2018146000 A1 | 8/2018 |

* cited by examiner

*Primary Examiner* — Andre Pierre Louis
(74) *Attorney, Agent, or Firm* — Norton Rose Fulbright US LLP; Gerard Messina

(57) ABSTRACT

A method for simulating a control unit. In the method, relationships between inputs and outputs of software component are modeled for at least one software component of the control unit, and a propagation time behavior of the control unit is simulated on the basis of the relationships.

12 Claims, 2 Drawing Sheets

METHOD AND DEVICE FOR SIMULATING A CONTROL UNIT

CROSS REFERENCE

The present application claims the benefit under 35 U.S.C. § 119 of German Patent Application No. DE 102019214162.5 filed on Sep. 17, 2019, which is expressly incorporated herein by reference in its entirety.

FIELD

The present invention relates to a method for simulating a control unit. The present invention also relates to a corresponding device, a corresponding computer program, and a corresponding memory medium.

BACKGROUND INFORMATION

The term highly automated driving (HAD) commonly refers to a stage of development between assisted driving, in which the driver is assisted in the driving task by numerous (often separate) driver assistance systems, and autonomous driving, in which the vehicle travels fully automatically and without driver intervention. In highly automated driving, the vehicle basically includes a separate intelligence, which plans ahead and could take over the driving task at least in most situations. The driver and the control units (electronic control units, ECUs) jointly guide the vehicle, the human driver determining, at any time, to what extent he/she intervenes into the driving behavior of the vehicle.

PCT Application No. WO 2018146000 A1 describes a control unit for a motor vehicle, which is configured for operating multiple applications and middleware and encompasses a memory jointly usable by the applications and the middleware (shared memory). The middleware is configured for handling an interprocess communication between the applications via the memory.

German Patent Application No. DE 102018207172 A1 describes a method for simulating a cyber-physical system (CPS) in a real operating situation, in which measured data and internal states of software components of the system in the operating situation are stored and a simulator is parameterized with the aid of the measured data and the states.

SUMMARY

The present invention provides a method for simulating a control unit, a corresponding device, a corresponding computer program, and a corresponding memory medium.

The approach according to the present invention is based on the finding that numerous driver assistance systems for highly automated driving are presently in the development phase. It is to be expected that the complexity of appropriate software exceeds that of conventional automotive applications by orders of magnitude.

Moreover, the provided approach is based on the insight that systems for highly automated driving are technically complex. This also applies for future robotic systems. They require a high computing power and a large memory and have considerably increased safety requirements. Taking the functional safety requirements into account additionally increases the system complexity.

Finally, the example method in accordance with the present invention described below accounts for the situation in which present-day systems in the automotive sector are often designed as directly communicating applications or components. As soon as they are available, data are immediately made available to other applications. The exact temporal relationship of the individual applications may often not be exactly predefined, for technical reasons, for example, since the number of independent computing cores remains far behind the number of applications executable thereon. The exact transmission point in time of specific data is therefore occasionally difficult to determine. The age of the data, which are received by a certain application, is therefore unpredictable and depends, to a great extent, on propagation time conditions.

A model-based simulation of time control and timing applying early in the development process is therefore desirable, in order to detect temporal "bottlenecks" already in the design phase and to be able to check the feasibility of non-functional requirements. In this way, in addition, the design may be regularly matched to the implementation during the development. Tools for this task, which are available on the market, are, for example, TA Tool Suite from Vector Informatik GmbH or chronSIM from INCHRON GmbH.

In a control unit encompassing numerous software components, the simulation of the transmission of pieces of information, primarily, represents a typical problem.

Timing simulations are generally not based on an equivalent functional model. According to the related art, a manual implementation or a considerable simplification of the assumptions is therefore generally necessary.

This approach is associated with limitations and a high outlay due, in particular, to the option to model activation conditions, which was created with respect to highly automated driving functions.

Against this background, one advantage of the approach according to the present invention is that it opens up the possibility for automatically creating timing models and considerably improving the quality of the timing simulation with the aid of an abstract modeling of the transmission of pieces of information. In addition, the single source principle is supported.

Advantageous refinements of and improvements on the basic features described herein are possible as a result of the further measures described herein.

BRIEF DESCRIPTION OF THE DRAWINGS

Exemplary embodiments of the present invention are represented in the figures and are explained in greater detail below.

DETAILED DESCRIPTION OF EXAMPLE EMBODIMENTS

Figure 1:
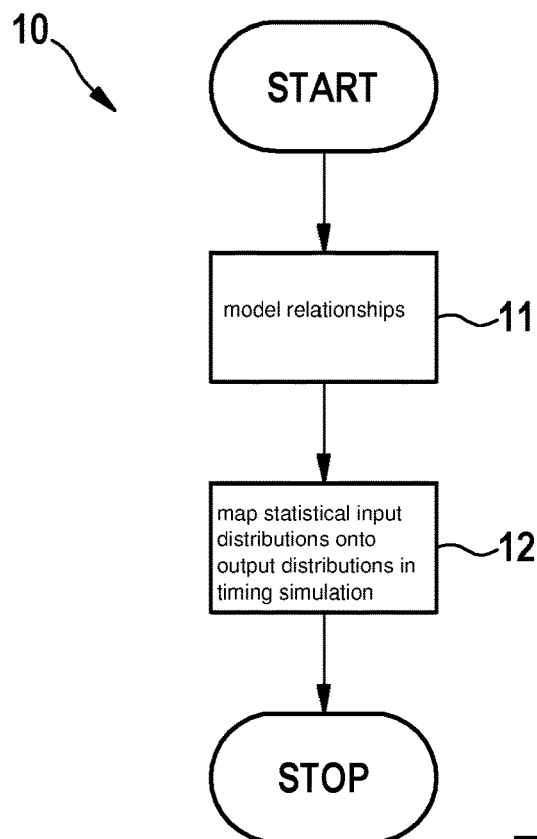
FIG. 1 shows the flow chart of a method according to a first specific embodiment.

FIG. 1 illustrates the basic sequence of an example method 10 according to the present invention.

Figure 2:
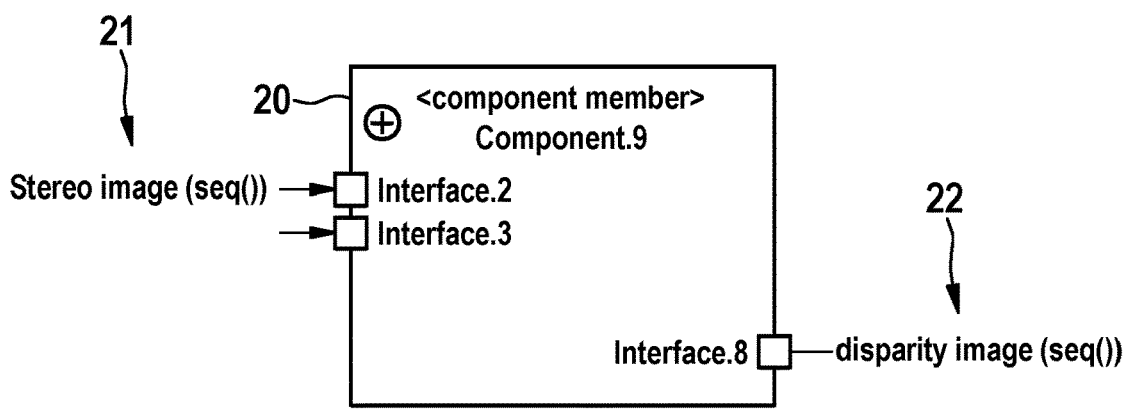
FIG. 2 shows in extracts the component diagram of a control unit to be simulated.

Its application will now be described with reference to software component 20 of a control unit depicted in FIG. 2. The relationships between inputs 21 and outputs 22 of software component 20 are modeled with the aid of a domain-specific description language (process 11—FIG. 1). For this purpose, the function "Input-output-relation( )" is introduced, which permits a description of the transmission of pieces of information such as sequence numbers and time stamps from inputs 21 to outputs 22. In the present example, "Input-output-relation(disparity, Stereo image (seq( )", for example, indicates that software component 20 obtains the sequence number at the output "disparity" from the input "Stereo image".

In a corresponding way, the expression "Input-output-relation(disparity, Stereo image (timestamp)" specifies that software component 20 obtains the time stamp at the output "disparity" from the input "Stereo image".

Preferably, "Input-output-relation(disparity, activation_timestamp)" models the situation in which software component 20 derives the time stamp at the output "disparity" from the point in time of its own activation.

Therefore, these relationships are comparable and usable in the activation condition, the simulation, and, preferably, the implementation.

Preferably, the function "output-expectation( )" is additionally introduced, which indicates how many sample values (samples) are generated at the output of software component 20 depending on its activation and its inputs 21. Therefore, the statistical input distributions may be mapped onto the output distributions of software component 20 in the subsequent timing simulation (process 12—FIG. 1).

This "productivity measure" is also important in order to simulate the statistical distribution of the activation of dependent components modeled with the aid of the activation condition. The latter is necessary, since the sample values produced at outputs 22 flow, as stimuli, into its activation condition.

Finally, "output-expectation (disparity, Stereo image, 1)" models the situation in which software component 20 produces a value at the output "disparity" upon activation per sample value at the input "Stereo image". Correspondingly, "output-expectation(disparity, 1)" models the situation in which software component 20 produces a sample value at the output "disparity" per activation.

Figure 3:
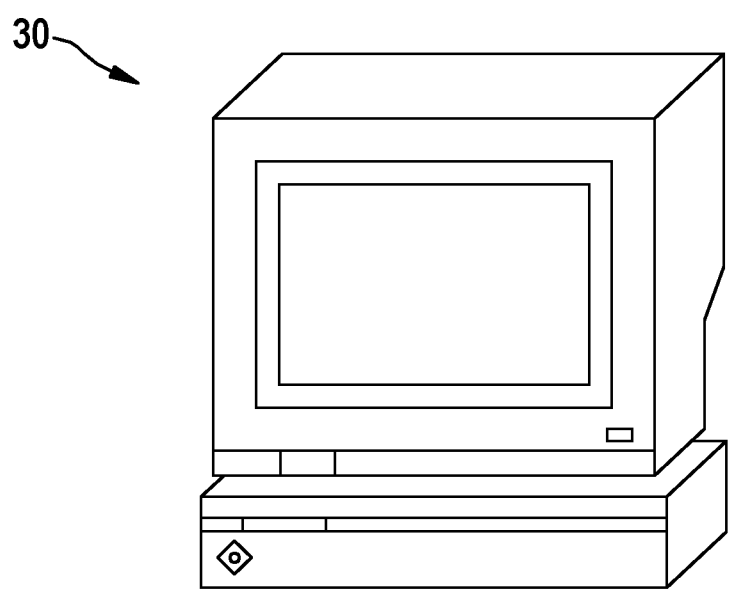
FIG. 3 schematically shows a workstation according to a second specific embodiment.

This example method 10 may be implemented, for example, in software or hardware or in a mixed form made up of software and hardware, for example, in a workstation 30, as the schematic representation from FIG. 3 illustrates.

What is claimed is:

1. A method for simulating a control unit, comprising the following steps:
modeling a relationship between a control unit input of at least one software component of the control unit and a control unit output of the software component using a formal coding language that defines a first function that specifies provision of a function output as a timestamp or sequence number at which the control unit output is to occur in response to the control unit input, the first function being represented in the formal coding by a function name with a parenthetical enclosing a plurality of function parameters, wherein the plurality of function parameters within the parenthetical include respective parameters for each of (a) the control unit input, (b) the control unit output, and (c) the timestamp or sequence number; and
simulating a propagation time behavior of the control unit based on the relationship by executing the first function.

2. The method as recited in claim 1, wherein the relationship includes a transmission of a piece of information from the control unit input to the control unit output.

3. The method as recited in claim 1, wherein the formal coding language is a domain-specific description language.

4. The method as recited in claim 1, wherein the formal coding language further defines a function, that, when executed, output a number of output values the control unit produces for a specified input or for a specified activation.

5. The method as recited in claim 1, wherein the first function specifies the provision of the function output as the timestamp at which the control unit output is to occur, and the plurality of function parameters within the parenthetical include the respective parameters for each of (a) the control unit input, (b) the control unit output, and (c) the timestamp.

6. The method as recited in claim 5, wherein a nested parameter is one of the parameters within the parenthetical, the nested parameter including a parenthetical within which a specification of the timestamp is included.

7. The method as recited in claim 6, wherein the specification of the timestamp is a parameter of a second function defined for the control unit input, the second function defined for the control unit input being the nested parameter of the first function.

8. The method as recited in claim 1, wherein the first function specifies the provision of the function output as the sequence number at which the control unit output is to occur, and the plurality of function parameters within the parenthetical include the respective parameters for each of (a) the control unit input, (b) the control unit output, and (c) the sequence number.

9. The method as recited in claim 8, wherein a nested parameter is one of the parameters within the parenthetical, the nested parameter including a parenthetical within which a specification of the sequence number is included.

10. The method as recited in claim 9, wherein the specification of the sequence number is a parameter of a second function defined for the control unit input, the second function defined for the control unit input being the nested parameter of the first function.

11. A non-transitory machine-readable memory medium on which is stored a computer program for simulating a control unit, the computer program, when executed by a computer, causing the computer to perform the following steps:
modeling a relationship between a control unit input of at least one software component of the control unit and a control unit output of the software component using a formal coding language that defines a first function that specifies provision of a function output as a timestamp or sequence number at which the control unit output is to occur in response to the control unit input, the first function being represented in the formal coding by a function name with a parenthetical enclosing a plurality of function parameters, wherein the plurality of function parameters within the parenthetical include respective parameters for each of (a) the control unit input, (b) the control unit output, and (c) the timestamp or sequence number; and
simulating a propagation time behavior of the control unit based on the relationship by executing the first function.

12. A device for simulating a control unit, the device configured to:
model a relationship between a control unit input of at least one software component of the control unit and a control unit output of the software component using a formal coding language that defines a first function that specifies provision of a function output as a timestamp or sequence number at which the control unit output is to occur in response to the control unit input, the first function being represented in the formal coding by a function name with a parenthetical enclosing a plurality of function parameters, wherein the plurality of function parameters within the parenthetical include respective parameters for each of (a) the control unit input, (b) the control unit output, and (c) the timestamp or sequence number; and simulate a propagation time behavior of the control unit based on the relationship by executing the first function.

\* \* \* \* \*